(12) United States Patent
Beckmann et al.

(10) Patent No.: US 10,810,683 B2
(45) Date of Patent: Oct. 20, 2020

(54) HIERARCHICAL META-LEDGER TRANSACTION RECORDING

(71) Applicant: General Electric Company, Schenectady, NY (US)

(72) Inventors: Benjamin Edward Beckmann, Niskayuna, NY (US); Annarita Giani, Niskayuna, NY (US); John William Carbone, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 351 days.

(21) Appl. No.: 15/819,516

(22) Filed: Nov. 21, 2017

(65) Prior Publication Data
US 2019/0156429 A1 May 23, 2019

(51) Int. Cl.
*G06Q 40/00* (2012.01)
*G06Q 20/40* (2012.01)

(52) U.S. Cl.
CPC ............ *G06Q 40/12* (2013.12); *G06Q 20/40* (2013.01)

(58) Field of Classification Search
CPC ............................... G06Q 40/12; G06Q 20/40
See application file for complete search history.

(56) References Cited

U.S. PATENT DOCUMENTS

| | | |
|---|---|---|
| 2016/0342977 A1 | 11/2016 | Lam |
| 2017/0046698 A1 | 2/2017 | Haldenby et al. |
| 2017/0132621 A1 | 5/2017 | Miller et al. |
| 2017/0232300 A1* | 8/2017 | Tran ............ G06F 3/017 434/247 |

(Continued)

FOREIGN PATENT DOCUMENTS

| | | |
|---|---|---|
| WO | 2016103055 A1 | 6/2016 |
| WO | 2017145020 A1 | 8/2017 |

OTHER PUBLICATIONS https://www.goland.org/off_chain_storage_and_the_enterprise/ ("Yaron") Feb. 15, 2017 (Year: 2017).*

(Continued)

*Primary Examiner* — A. Hunter Wilder
*Assistant Examiner* — Joseph M Mutschler
(74) *Attorney, Agent, or Firm* — Buckley, Maschoff & Talwalkar LLC

(57) ABSTRACT

An original transaction data store may provide information about a series of transactions over time. A transaction data collection platform may group some of those transactions into a subset of transactions and apply a hash function to that subset to create a signature representing verifiable state information associated with an enterprise. The transaction data collection platform may then record information about the signature via a secure, distributed transaction meta-ledger without recording the subset of transactions. According to some embodiments, a transaction audit platform may retrieve the signature from the meta-ledger and retrieve original information associated with the subset of transactions (e.g., from an offline original transaction data store). The transaction audit platform may then apply the hash function to the original information to re-create an original signature, compare the retrieved signature with the original signature, and output an indication of a verification result of the comparison.

12 Claims, 19 Drawing Sheets

(56) References Cited

U.S. PATENT DOCUMENTS

2018/0115428 A1* 4/2018 Lysenko ............... H04L 9/0637
2020/0177377 A1* 6/2020 Smith ................... H04L 9/3271

OTHER PUBLICATIONS

Wilkinson et al., "Metadisk: Blockchain-Based Decentralized File Storage Application", Dec. 23, 2014, 11 pp.
Lewison et al., "Backing Rich Credentials with a Blockchain PKI?", Oct. 24, 2016, 19 pp.
Fukmitsu et al., "A Proposal of a Secure P2P-Type Storage Scheme by Using the Secret Sharing and the Blockchain", 2017 IEEE 31st International Conference on Advanced Information Networking and Applications (AINA), pp. 803-810, Taipei, Mar. 27-29, 2017, 8 pp.
Zikratov et al., Ensuring Data Integrity Using Blockchain Technology, Proceeding of the 20th Conference of Fruct Association, Issue: 2305-7254, pp. 535-539, 6 pp.

* cited by examiner

HIERARCHICAL META-LEDGER TRANSACTION RECORDING

BACKGROUND

Some embodiments disclosed herein relate to verifiable state information about an enterprise and, more particularly, to recording a signature in a secure, distributed transaction meta-ledger.

In some cases, an enterprise might want to record verifiable state information. For example, a company manufacturing parts for an airplane engine might want to be able to verify when a particular component was produced, the process parameters associated with its production (e.g., a printer resolution and manufacturing temperature), quality assurance test results, etc. The company might want to record this information, for example, to comply with regulatory requirements, to help identify the source of an error or defect, etc. Similarly, an information technology department might want to periodically record the state of system hardware, software versions, anti-virus updates, user access logs, etc. (e.g., in connection with cyber-security measures).

Moreover, in some cases a third party might want to be able to audit prior or historic state information associated with the enterprise. For example, an insurance company might want to verify that a business was complying with cyber-insurance guidelines when a data breach occurred. To achieve this ability to verify past state information, the enterprise could periodically supply a complete set of state information details to the third party who would then store the information (e.g., in a database) and retrieve details as needed. Such an approach, however, might not be practical when there is a substantial amount of state information and/or when the state information is frequently updated. Moreover, an enterprise might be reluctant to share such a complete set of detailed information with the third party (e.g., the information might include trade secrets, confidential processes, personal information, etc.). It may therefore be desirable to provide systems and methods to efficiently and accurately record verifiable state information associated with an enterprise via a secure, distributed transaction meta-ledger.

SUMMARY

According to some embodiments, an original transaction data store may provide information about a series of transactions over time. A transaction data collection platform may group some of those transactions into a subset of transactions and apply a hash function to that subset to create a signature representing verifiable state information associated with an enterprise. The transaction data collection platform may then record information about the signature via a secure, distributed transaction meta-ledger without recording the subset of transactions. According to some embodiments, a transaction audit platform may retrieve the signature from the meta-ledger and retrieve original information associated with the subset of transactions (e.g., from an offline original transaction data store). The transaction audit platform may then apply the hash function to the original information to re-create an original signature, compare the retrieved signature with the original signature, and output an indication of a verification result of the comparison.

Some embodiments comprise: means for storing, in an offline original transaction data store, electronic records that represent original information of a series of transactions over time associated with an enterprise; means for receiving, at a transaction data collection platform from an original transaction data store, information about the series of transactions over time; means for grouping a plurality of the series of transactions into a subset of transactions; means for applying a hash function to the subset of transactions to create a signature representing verifiable state information associated with the enterprise; and means for recording information about the signature via a secure, distributed transaction meta-ledger without recording the subset of transactions.

Some embodiments comprise: means for retrieving, at a transaction audit platform, a signature from a secure, distributed transaction meta-ledger; means for retrieving, from an original transaction data store, original information associated with a subset of transactions; means for applying a hash function to the original information to re-create an original signature; means for comparing the retrieved signature with the original signature; and means for outputting an indication of a verification result of said comparison.

Technical effects of some embodiments of the invention are improved and computerized ways to efficiently and accurately record verifiable state information associated with an enterprise via a secure, distributed transaction meta-ledger. With these and other advantages and features that will become hereinafter apparent, a more complete understanding of the nature of the invention can be obtained by referring to the following detailed description and to the drawings appended hereto.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
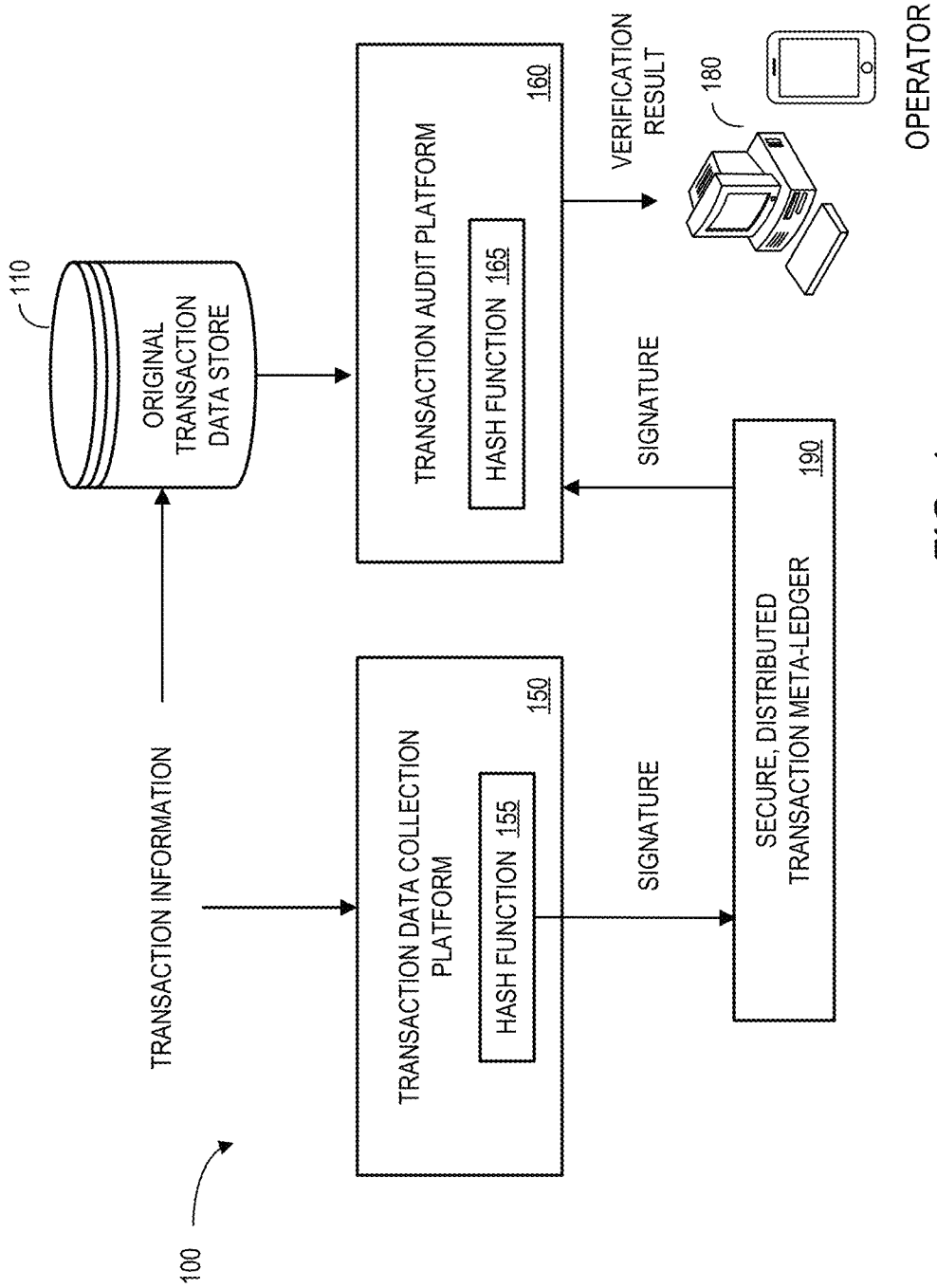
FIG. 1 is a high-level block diagram of a system according to some embodiments.

It may generally be desirable to efficiently and accurately record verifiable state information associated with an enterprise via a secure, distributed transaction meta-ledger. FIG. 1 is a high-level block diagram of a system 100 according to some embodiments. In particular, the system 100 includes a transaction data collection platform 150 that receives "transaction data" associated with an enterprise. As used herein, the phrase "transaction data" might refer to, for example, any information associated with a state of the enterprise, including data associated with a process (e.g., production, testing, etc.), posture (e.g., cyber-security insurance or configuration), product (e.g., identifier, location, etc.), etc. An enterprise might refer to any entity, such as a business, hospital, school, bank, governmental institution, etc.

The transaction data collection platform 150 may further include a has function 155 or similar algorithm able to generate a signature based on a portion of the transaction data. The signature may then be stored in a secure, distributed meta-ledger 190 and later be retrieved by a transaction audit platform 160. The transaction audit platform 160 may retrieve the original transaction data from an original transaction store 110 and use a has function 165 to re-create the original signature. By comparing the signature in the meta-ledger 190 with the re-created original signature, the transaction audit platform 160 may verify that the state of the enterprise. The result of this verification might be, for example, automatically transmitted to an operator device 180, an email server, a workflow management system, etc.

According to some embodiments, the secure, distributed meta-ledger 190 utilizes "blockchain" technology. As used herein, the term "blockchain" may refer to a list of records, called blocks, which are linked and secured using cryptography. Each block may contain, for example, a hash pointer as a link to a previous block, a timestamp, transaction data, etc. As a result, a blockchain may resistant to data modification or tampering allowing parties to efficiently record information in a verifiable and permanent way. According to some embodiments, a blockchain is managed by a peer-to-peer network that adheres to a protocol for validating new blocks. Once recorded, the data in s block can't be altered retroactively without the alteration of all subsequent blocks. Note that the transaction data collection platform 150 and/or transaction audit platform 160 could be completely de-centralized (e.g., a cloud-based service) and/or might be associated with a third party, such as a vendor that performs a service for an enterprise.

The transaction data collection platform 150 and/or transaction audit platform 160 might be, for example, associated with a Personal Computer ("PC"), laptop computer, a tablet computer, a smartphone, an enterprise server, a server farm, an energy transaction engine, and/or a database or similar storage devices. According to some embodiments, an "automated" transaction data collection platform 150 and/or transaction audit platform 160 may automatically facilitate verification of transaction and/or state information associated with an enterprise. As used herein, the term "automated" may refer to, for example, actions that can be performed with little (or no) intervention by a human.

As used herein, devices, including those associated with the transaction data collection platform 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The transaction data collection platform 150 and transaction audit platform 160 may store information into and/or retrieve information from an original transaction data store 110. The original transaction data store 110 might, for example, store electronic records representing transactions associated with an enterprise. The original transaction data store 110 may be locally stored or reside remote from the transaction data collection platform 150 and transaction audit platform. Although a single transaction data collection platform 150 and transaction audit platform are shown in FIG. 1, any number of such devices may be included. Moreover, various devices described herein might be combined according to embodiments of the present invention. For example, in some embodiments, the transaction data collection platform 150, the secure distributed meta-ledger 190, and/or other devices might be co-located and/or may comprise a single apparatus.

Figure 2:
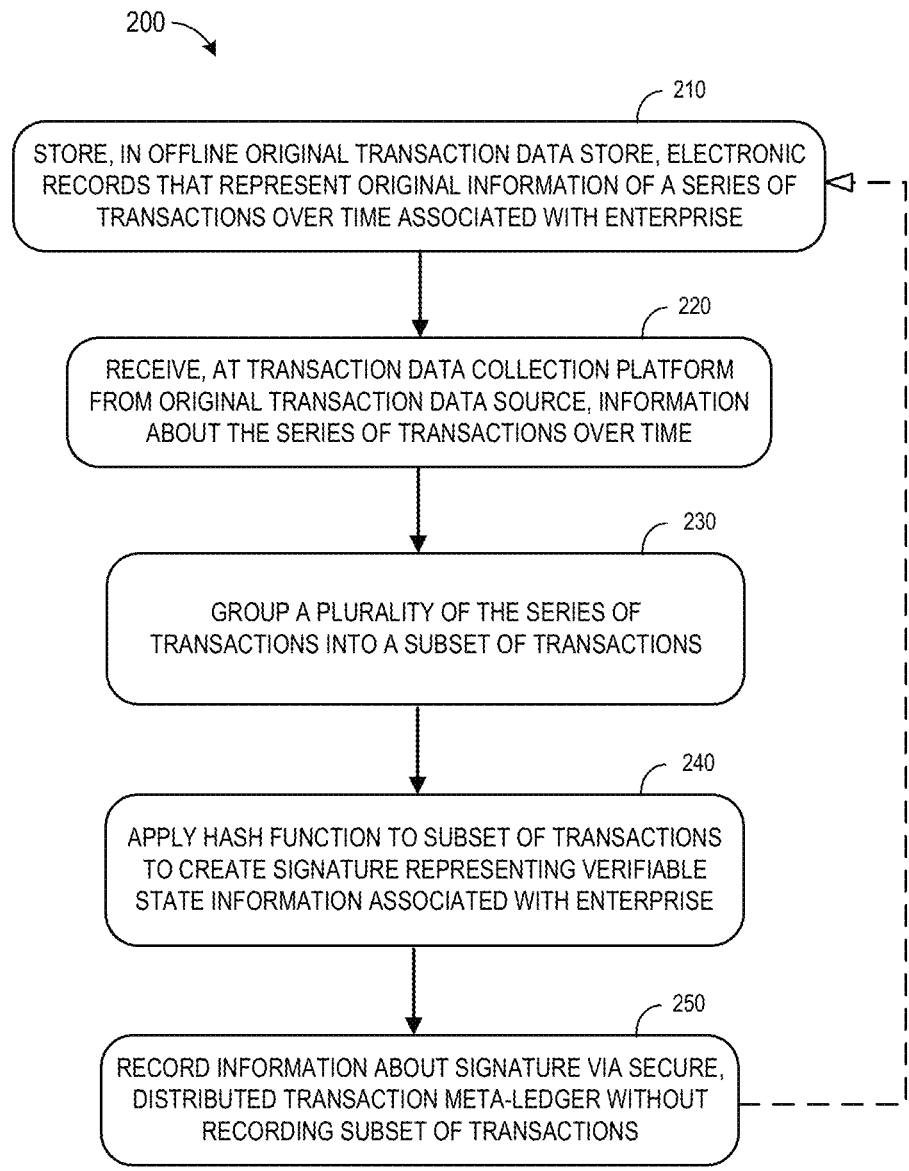
FIG. 2 is a method that may be associated with collecting transaction data in accordance with some embodiments.

In this way, the system 100 may efficiently and accurately record verifiable state information associated with an enterprise via the secure, distributed transaction meta-ledger 190. For example, FIG. 2 illustrates a method 200 that might be performed by the transaction data collection platform 150 and/or other elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 210, an enterprise may store, in an offline original transaction data store, electronic records that represent original information of a series of transactions over time associated with the enterprise. The original transaction data store may be "offline" in the sense that the data does not need to be immediately accessible (thus reducing storage costs).

At 220, a transaction data collection platform may receive, from an original transaction data store, information about the series of transactions over time. According to some embodiments, the transaction data collection platform may receive this information directly from the enterprise. According to other embodiments, the transaction data collection platform may receive this information from the original transaction data store.

At 230, the transaction data collection platform may group a plurality of the series of transactions into a subset of transactions. For example, this grouping might be based on an occurrence of a pre-determined period of time (e.g., once-per-hour, at the close of a business day, once-per-week, etc.). According to other embodiments a group might be defined as a pre-determined number of transactions, when the series of transactions contains a pre-determined amount of data, etc.

At 240, the transaction data collection platform may apply a hash function to the subset of transactions to create a "signature" representing verifiable state information associated with the enterprise. By ways of examples only, the hash function might be associated with a Secure Hash Algorithm 1 ("SHA-1") and/or a Message Digest 5 ("MD5") hash function to create a signature comprising an alphanumeric string of a pre-determined length. As used herein, the phrase "hash function" may refer to any function that can be used to map data of arbitrary size to data of fixed size. The values returned by a hash function may be referred to as hash values, hash codes, digests, hashes, fingerprints, key values, etc. Embodiments might also be associated with checksums, check digits, compression, randomization functions, error-correcting codes, etc.

At 250, the system may record information about the signature via a secure, distributed transaction meta-ledger. Note that this data may be recorded without recording the original subset of transactions (e.g., so there is no risk of divulging sensitive information to a third party who can access the meta-ledger). Moreover, because the meta-ledger is distributed and secure, it may be impractical for the enterprise to attempt to change the data in future. The steps of FIG. 2 may then be repeated (as illustrated by the dashed arrow in FIG. 2) such that information about multiple subsets of transactions are recorded in the secure, distributed transaction meta-ledger.

Figure 3:
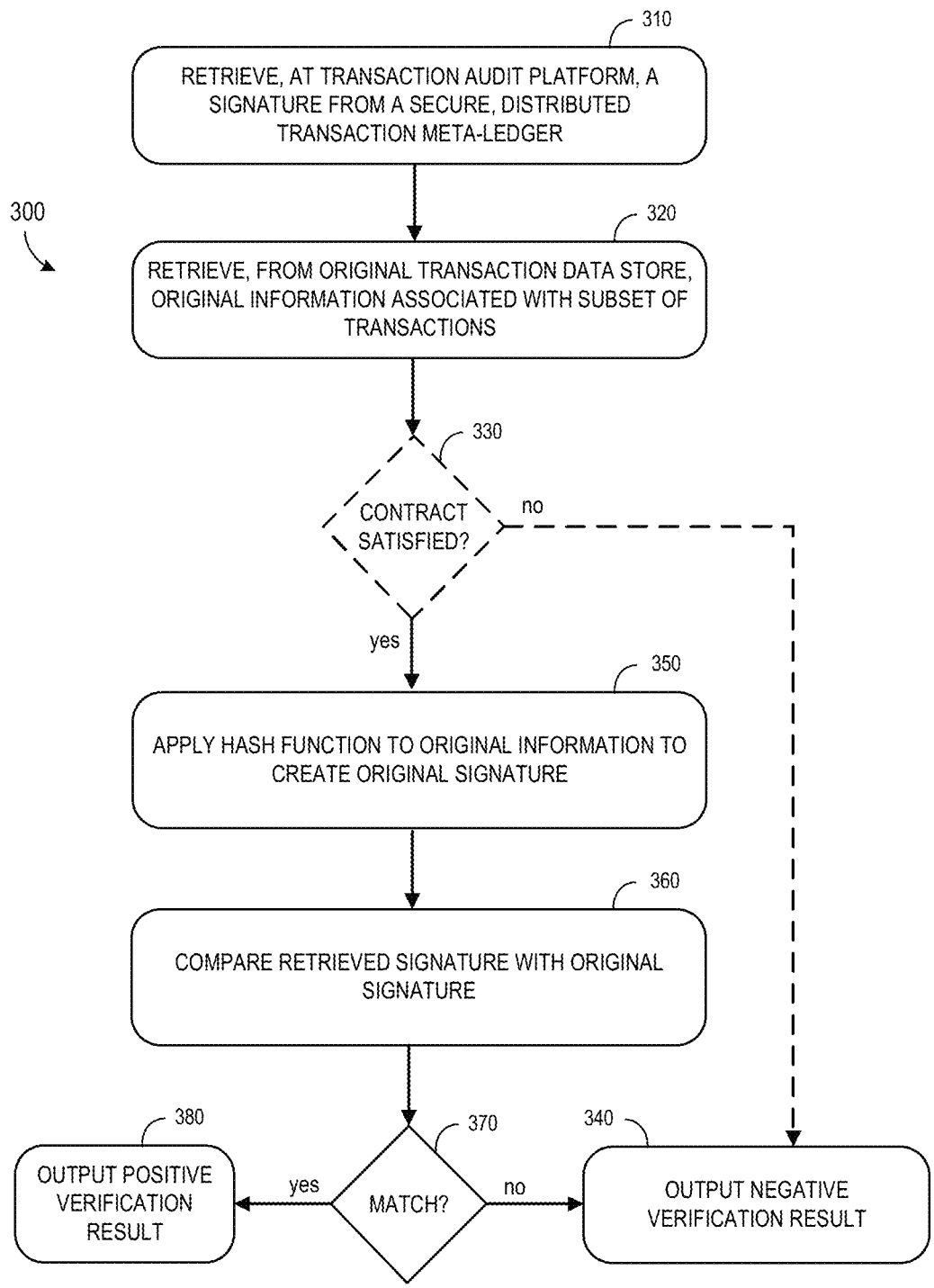
FIG. 3 is a method that may be associated with auditing transaction data according to some embodiments.

The meta-ledger might then be used by a third-party to verify the state of the enterprise at any prior point in time. For example, FIG. 3 is a method that may be associated with auditing transaction data according to some embodiments. At 310, a transaction audit platform may retrieve the signature from the secure, distributed transaction meta-ledger. At 320, the transaction audit platform may retrieve, from the original transaction data store, original information associated with the subset of transactions.

According to some embodiments (as illustrated by the dashed element in FIG. 3), the system may determine if a smart contract associated with the meta-ledger is satisfied at 330. For example, the smart contract might indication who is authorized to verify transaction information, what conditions must be met to allow verification, etc. If the smart contract is not satisfied at 330, an indication of a negative verification result of the comparison may be output at 340 (that is, the state of the enterprise could not be verified).

If the smart contract (if any) is satisfied at 330, the transaction audit platform may apply the hash function (e.g., the same algorithm that was used by the transaction data collection platform) to the original information to re-create an original signature at 350.

At 360, the transaction audit platform may compare the retrieved signature with the original signature. If the results do not match at 370, an indication of a negative verification result of the comparison may be output at 340 (that is, the state of the enterprise could not be verified). If the results do match at 370, an indication of a positive verification result of the comparison may be output at 380 (that is, the state of the enterprise was successfully verified).

Figure 4:
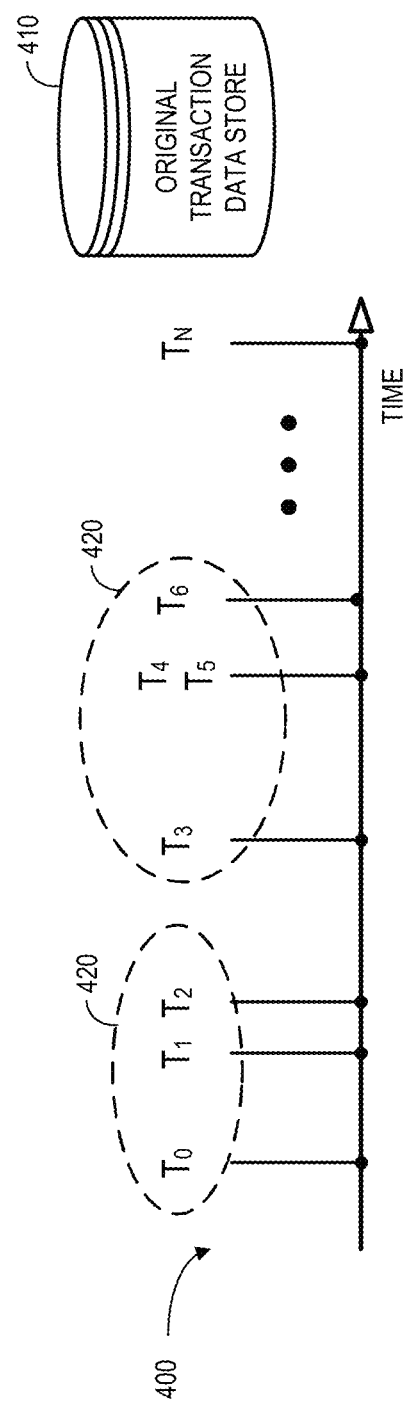
FIG. 4 illustrates transaction data in accordance with some embodiments.

FIG. 4 illustrates transaction data 400 in accordance with some embodiments. In particular, a series of transactions $T_0$ through $T_N$ have occurred over time. The transactions might be associated with, for example, an industrial asset item manufactured by an enterprise, cyber-security information, a digital twin of a physical system, etc. According to some embodiments, the transactions may be stored into an original transaction data store 410. Note that it is possible that two transactions might occur simultaneously (e.g., $T_4$ and $T_5$ in FIG. 4). According to some embodiments, an enterprise or transaction data collection platform may group the transaction into subsets 420 (e.g., as illustrated by a dashed line in FIG. 4, transactions $T_0$, $T_1$, and $T_2$ have been grouped into a subset).

Figure 5:
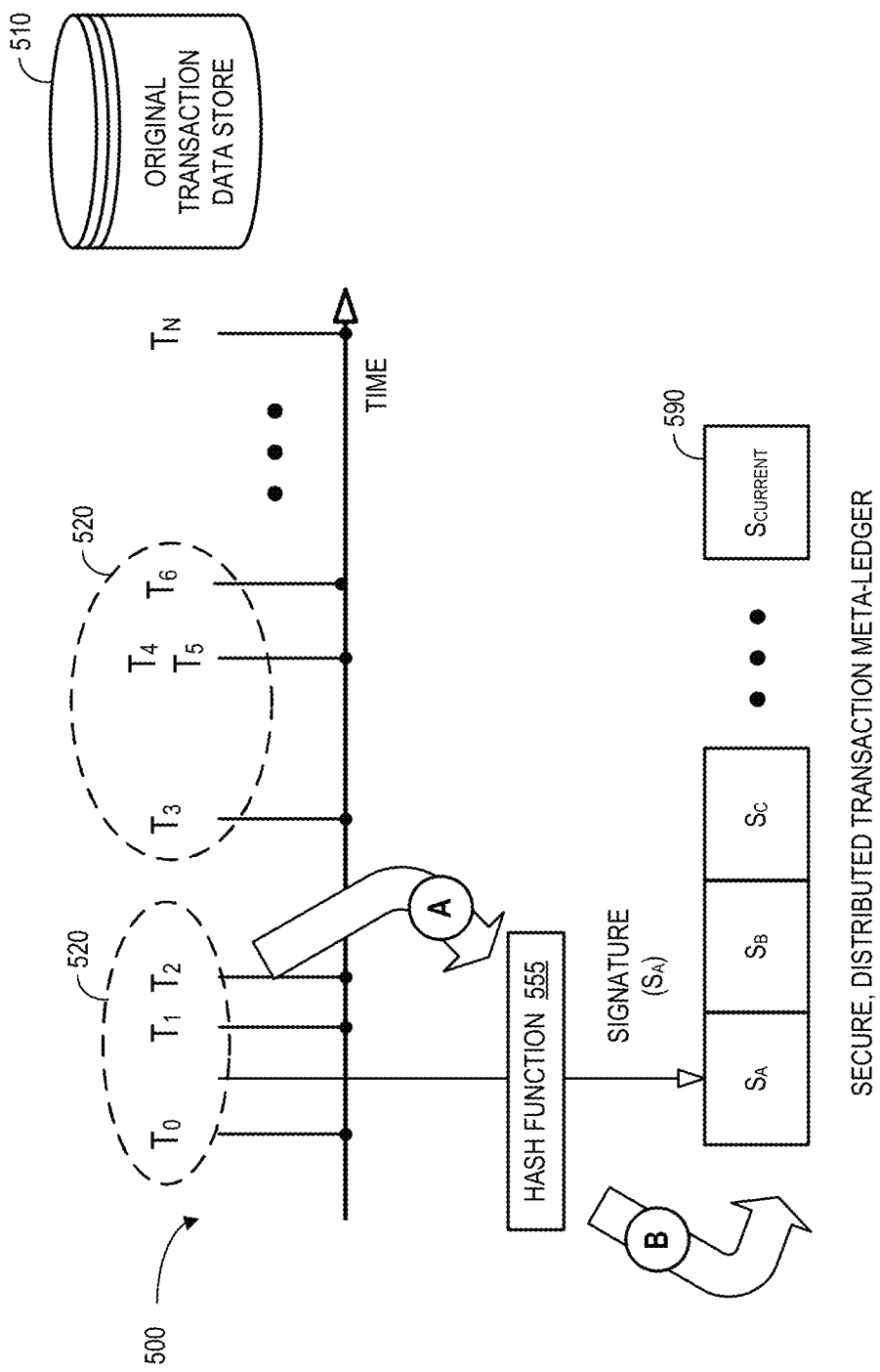
FIG. 5 is a process flow diagram associated with collecting transaction data according to some embodiments.

FIG. 5 is a process flow diagram 500 associated with collecting transaction data according to some embodiments. As before, a series of transactions $T_0$ through $T_N$ have occurred over time and are stored into an original transaction data store 510. Moreover, the transactions have been grouped into subsets 520 (e.g., as illustrated by a dashed line in FIG. 5, transactions $T_3$, $T_4$, $T_5$, and $T_6$ have been grouped into a subset). At (A), a hash function 555 is applied to the first subset 520 to create a hash value signature $S_A$ (e.g., a string of hexadecimal values of a pre-determined length). The signature $S_A$ is then stored into a secure, distributed meta-ledger 590 at (B). As time goes on, additional signatures are stored into the meta-ledger 590 (e.g., $S_B$, $S_C$, through $S_{CURRENT}$).

Figure 6:
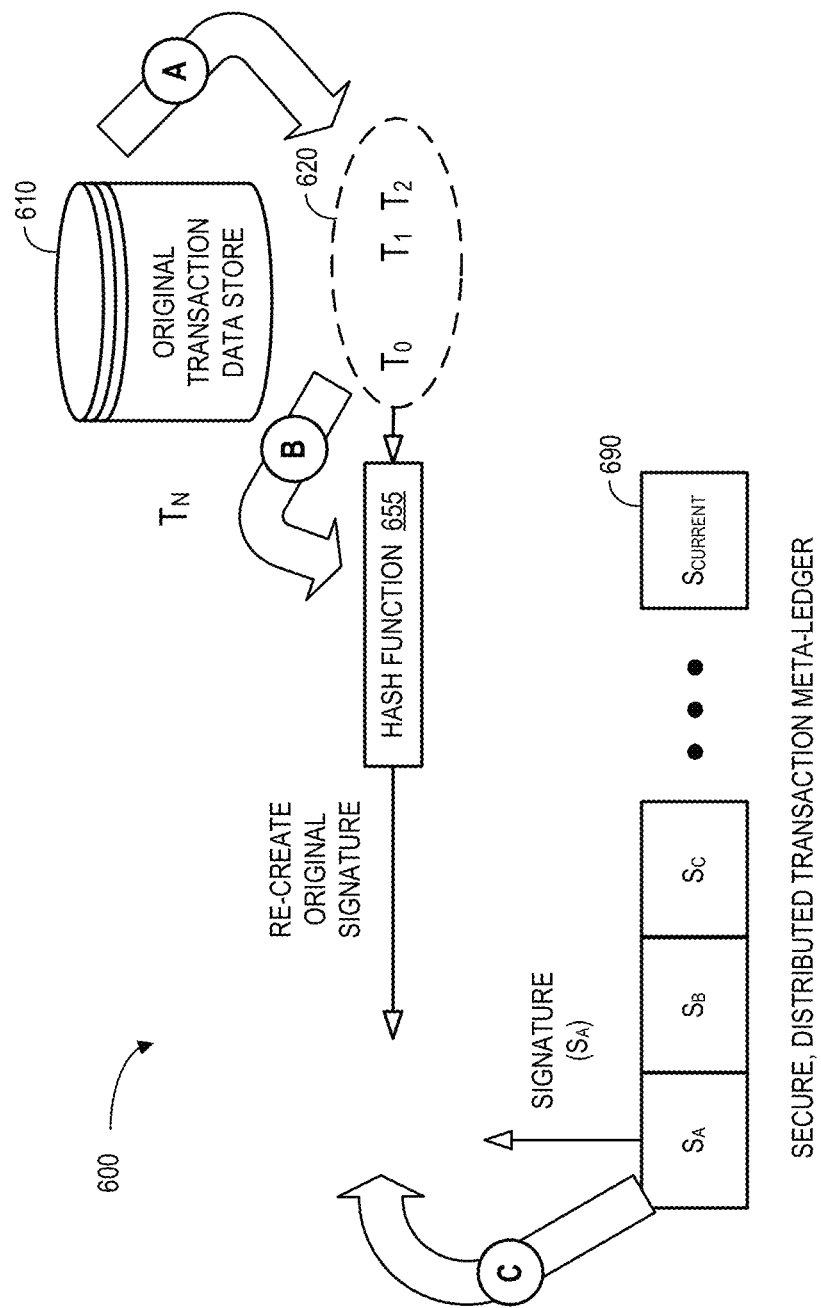
FIG. 6 is a process flow diagram associated with auditing transaction data in accordance with some embodiments.

The signatures in the meta-ledger 590 may then later be used (e.g., by a transaction audit platform associated with a third party) to validate the state of the enterprise at various points in time. For example, FIG. 6 is a process flow diagram 600 associated with auditing transaction data in accordance with some embodiments. At (A), the original transactions T0 through T2 are retrieved from the original transaction data store 610. At (B), a hash function 655 (e.g., the same function 555 that was applied in the data collection diagram 500) is applied to those transactions to re-create the original signature. At (C), the signature $S_A$ stored in the meta ledger 690 is retrieved and the two signature values may be compared to validate the state of the enterprise.

Thus, embodiments may provide a method to collect and store irrefutable state information represented in a transaction data store (which, in some embodiments, might be implemented as one or more standalone blockchains). Such an approach may support forensic review of information stored the transaction data store. Moreover, embodiments may allow for the monitoring, sharing/reporting, and/or auditing of information collected in a transaction data store. For example, data produced when processing can be stored in a blockchain. Periodically, a key derived from the stored data, in either a continuous or discrete manner, can be transmitted and stored in a meta-ledger. The key stored in the meta-chain can then be used to certify that the stored data, when referenced in the future, is authentic.

Note that any of the embodiments described herein may support regionally and/or logically distributed ledgers to provide proof of data existence that cannot be counterfeited. Moreover, embodiments may implement methods to prune information (e.g., such that produced products are removed from an operational chain as appropriate) and/or to minimize the amount of data that is needed to be stored in the meta-ledger.

Figure 7:
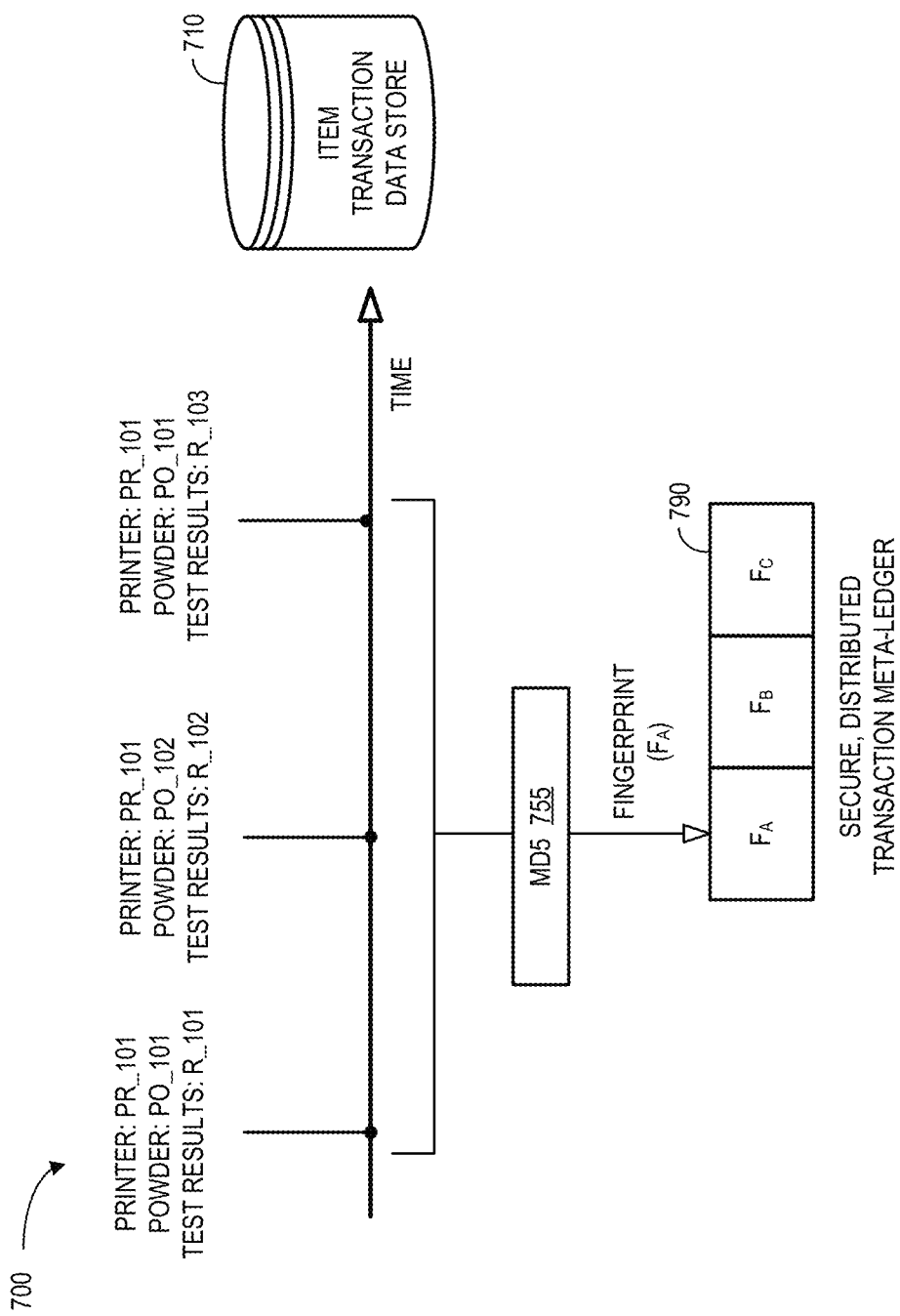
FIG. 7 illustrates industrial asset item transaction data according to some embodiments.

Embodiments may be used to verify enterprise state information in any of a number of different environments. For example, FIG. 7 illustrates industrial asset item transaction data 700 according to some embodiments. In this case, several transactions associated with an industrial asset item (e.g., a wind turbine, jet engine, etc.) are stored into an item transaction data store 710 as well as being used to create a fingerprint $F_A$, via an MD5 algorithm 755 that is stored into a secure, distributed transaction meta-ledger 790. The state information associated with the transactions might include, for example, an item identifier, an item description, a manufacturing process parameter (e.g., a three-dimensional additive manufacturing printer model number), a quality control value, transportation information (e.g., associated with delivery via a supply chain), date information (e.g., a date of manufacture or expiration), etc.

Figure 8:
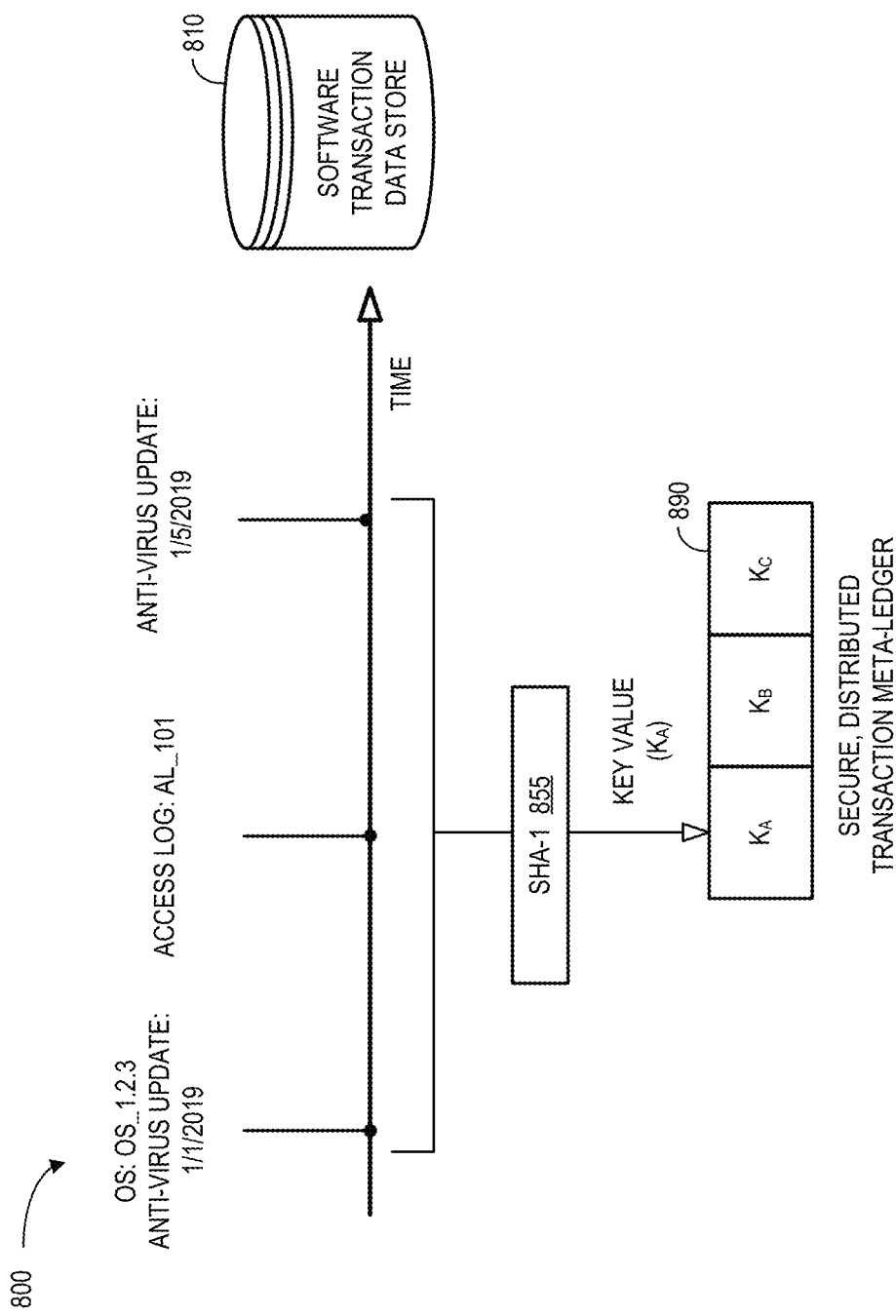
FIG. 8 illustrates cyber-security transaction data in accordance with some embodiments.

As another example, FIG. 8 illustrates cyber-security transaction data 800 in accordance with some embodiments. As before, several transactions associated with an information technology network are stored into software transaction data store 810 as well as being used to create a key value $K_A$, via SHA-1 algorithm 855 that is stored into a secure, distributed transaction meta-ledger 890. The state information associated with the transactions might include, for example, software identifiers, software update information, network access logs, anti-virus software data, etc. Consider, for example, a retailer who agrees to insure an enterprise against the risk of a data breach by an unauthorized retailer. In exchange for a reduced insurance premium, the retailer agrees to conform to a set of computer security guidelines or requirements. Upon the occurrence of a data breach, the insurer may access the meta-ledger 890 and extract the relevant key value (e.g., the key value associated with the date of the breach). The retailer can provide the original transaction data and the insurer can accurately verify that the transaction data matches the relevant key value (that is, the retail cannot provide the insurer with incorrect transaction information and thus the data can be "validated").

Figure 9:
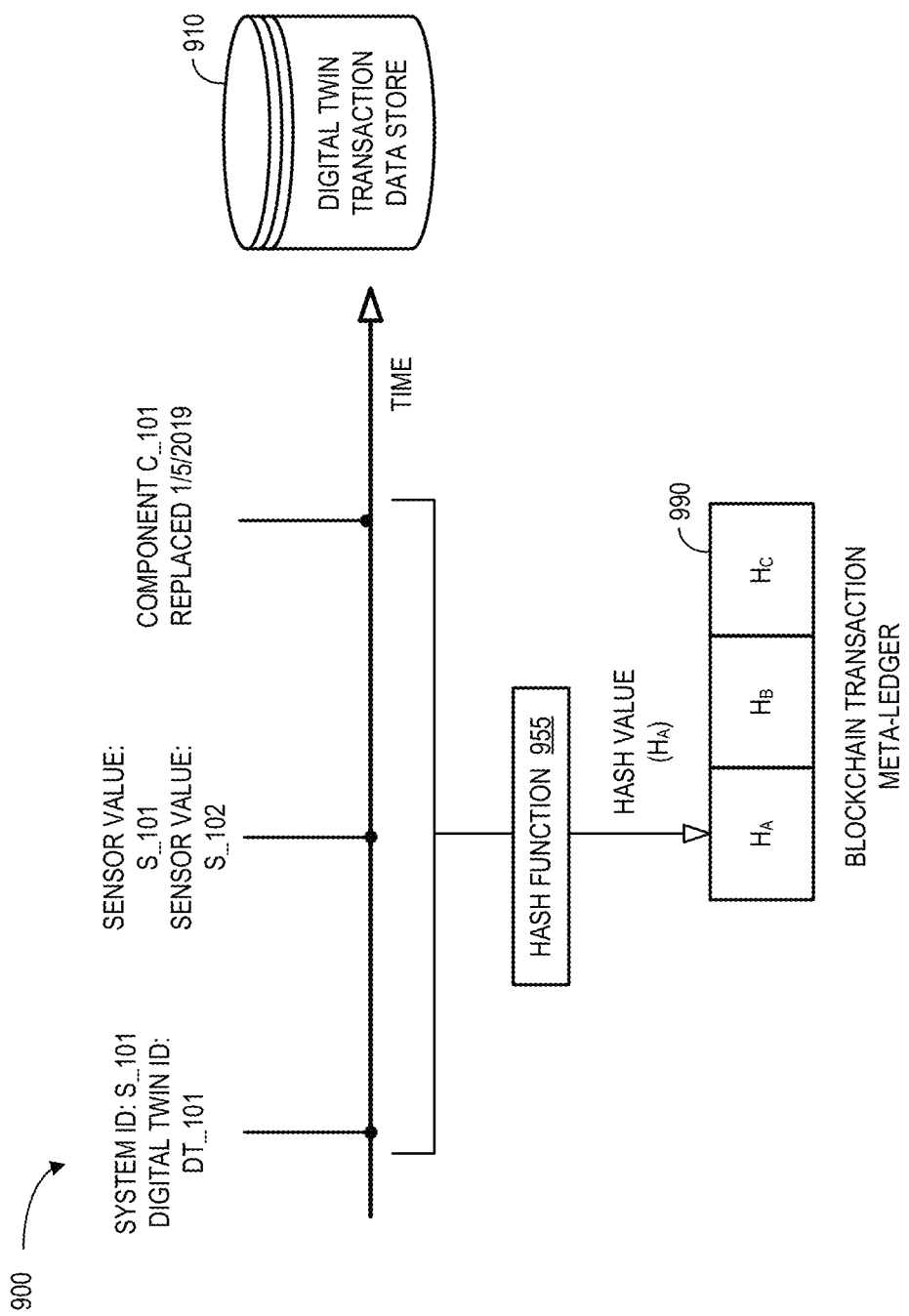
FIG. 9 illustrates digital twin transaction data in accordance with some embodiments.

As still another example, FIG. 9 illustrates digital twin transaction data 900 in accordance with some embodiments. As used herein, the phrase "digital twin" may refer to a computer model that tracks and simulates a real-world physical asset (e.g., a power grid component). Once again, several transactions associated with digital twin are stored into digital twin transaction data store 910 as well as being used to create a hash value $H_A$, via a hash function 955 that is stored into a blockchain transaction meta-ledger 990. The state information associated with the transactions might include, for example, a system identifier, a digital twin identifier, a sub-component identifier, an activity log, sensor values (e.g., a gas turbine inlet temperature), monitoring node information (e.g., the position of an actuator), output data (e.g., an amount of power being generated), etc.

Figure 10:
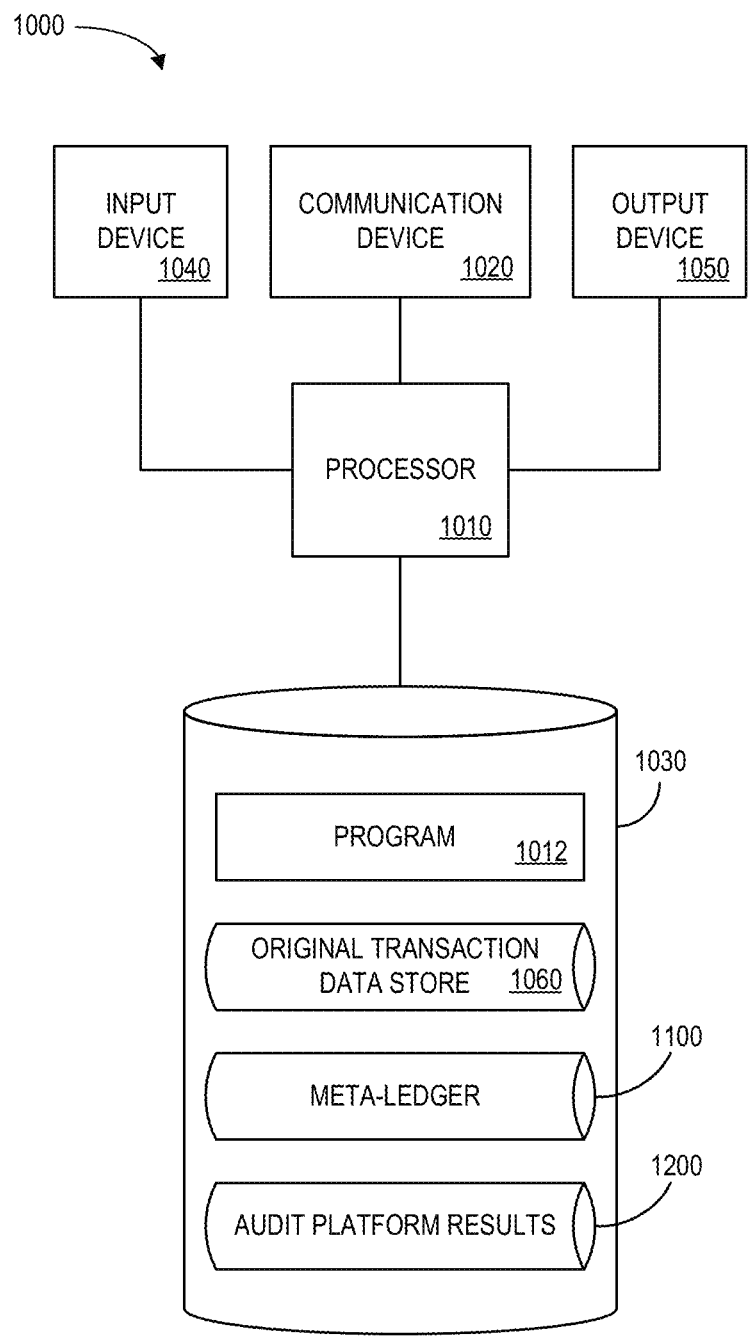
FIG. 10 illustrates a platform according to some embodiments.

Embodiments described herein may comprise a tool that facilitates verification of transaction data via a secure, distributed meta-ledger and may be implemented using any number of different hardware configurations. For example, FIG. 10 illustrates a platform 1000 that may be, for example, associated with the system 100 of FIG. 1 (as well as other systems described herein). The platform 1000 comprises a processor 1010, such as one or more commercially available Central Processing Units ("CPUs") which may be in the form of one-chip microprocessors, coupled to a communication device 1020 configured to communicate via a communication network (not shown in FIG. 10). The communication device 1020 may be used to communicate, for example, with one or more remote meta-ledgers and/or operator devices. Note that communications exchanged via the communication device 1020 may utilize security features, such as those between a public internet user and an internal network of an insurance enterprise. The security features might be associated with, for example, web servers, firewalls, and/or PCI infrastructure. The platform 1000 further includes an input device 1040 (e.g., a mouse and/or keyboard to enter information about an enterprise, a transaction, etc.) and an output device 1050 (e.g., to output audit reports, alerts when validations fail, etc.).

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and/or network security service tool or application for controlling the processor 1010. The processor 1010 performs instructions of the program 1012, and thereby operates in accordance with any of the embodiments described herein. For example, the processor 1010 may receive information about a series of transactions over time. The processor 1010 may group some of those transactions into a subset of transactions and apply a hash function to that subset to create a signature representing verifiable state information associated with an enterprise. The processor 1010 may then record information about the signature via a secure, distributed transaction meta-ledger without recording the subset of transactions. According to some embodiments, the processor may retrieve the signature from the meta-ledger and retrieve original information associated with the subset of transactions (e.g., from an offline original transaction data store). The processor may then apply the hash function to the original information to re-create an original signature, compare the retrieved signature with the original signature, and output an indication of a verification result of the comparison.

The program 1012 may be stored in a compressed, uncompiled and/or encrypted format. The program 1012 may furthermore include other program elements, such as an operating system, a database management system, and/or device drivers used by the processor 1010 to interface with peripheral devices.

As used herein, information may be "received" by or "transmitted" to, for example: (i) the platform 1000 from another device; or (ii) a software application or module within the platform 1000 from another software application, module, or any other source.

In some embodiments (such as shown in FIG. 10), the storage device 1030 further stores an original transaction data store 1060, a meta-ledger 1100, and audit platform results 1200. Examples of databases that might be used in connection with the platform 1000 will now be described in detail with respect to FIGS. 11 and 12. Note that the databases described herein are only examples, and additional and/or different information may be stored therein. Moreover, various databases might be split or combined in accordance with any of the embodiments described herein. For example, the meta-ledger 1100 or audit platform results 1200 might be combined and/or linked to each other within the program 1012.

Figure 11:
FIG. 11 is a tabular portion of a meta-ledger in accordance with some embodiments.

Referring to FIG. 11, a table is shown that represents the meta-ledger 1100 that may be stored at the platform 1000 in accordance with some embodiments. The table may include, for example, entries identifying transaction groups or subsets that have be collected by an enterprise. The table may also define fields 1102, 1104, 1106 for each of the entries. The fields 1102, 1104, 1106 may, according to some embodiments, specify: a transaction subset identifier 1102, a date and time 1104, and a signature 1106. The meta-ledger 1100 may be created and updated, for example, based on information electrically received from an enterprise, a transaction data collection platform, etc.

The transaction subset identifier 1102 may be, for example, a unique alphanumeric code identifying a group of transactions associated with the state of an enterprise as of the date and time 1104. The signature 1106 may comprise a string of characters (e.g., of a pre-determined length) that represents the result of a hash algorithm applied to that group of transactions. The metal-ledger 1100 may be stored in a secure, distributed blockchain or similar technology in accordance with any of the embodiments described herein.

Figure 12:
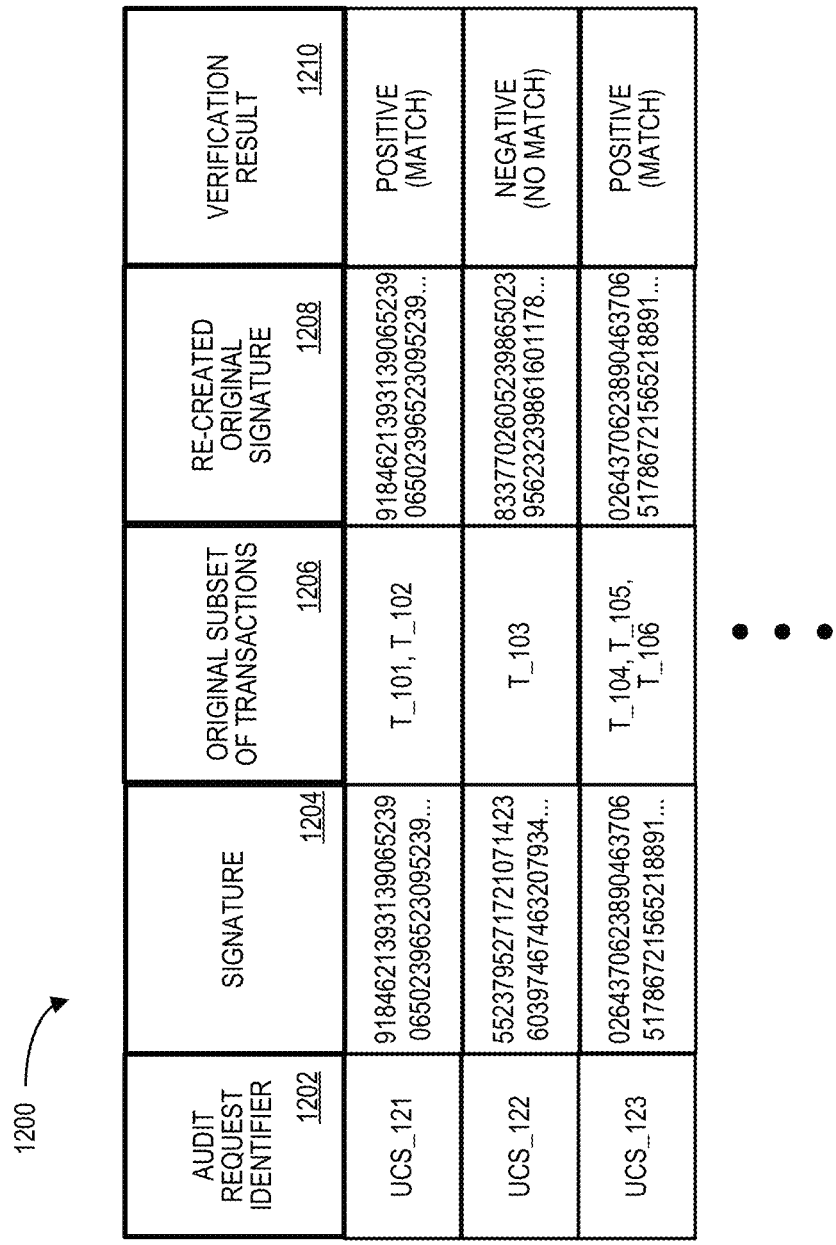
FIG. 12 is a tabular portion of audit platform results according to some embodiments.

FIG. 12 is a portion of audit platform results 1200 that may be stored at the platform 1000 in accordance with some embodiments. The table may include, for example, entries identifying requests to verify transaction information associated with the state of an enterprise. The table may also define fields 1202, 1204, 1206, 1208, 1210 for each of the entries. The fields 1202, 1204, 1206, 1208, 1210 may, according to some embodiments, specify: an audit request identifier 1202, a signature 1204, an original subset of transactions 1206, a re-created original signature 1208, and a verification result 1210. The audit platform results 1200 may be created and updated, for example, based on information electrically received from remote meta-ledgers, original transaction data stores, operator devices, third party devices, etc.

The audit request identifier 1202 may be, for example, a unique alphanumeric code identifying a request by a third-party to verify historic or past state information associated with an enterprise. The signature 1204 may comprise a string of characters (e.g., of a pre-determined length) retrieved from the signature 1106 in the meta-ledger 1100. The original subset of transactions 1206 may represent the group of transactions that being verified (e.g., based on data retrieved from an original transaction store). The re-created original signature 1208 may comprise a string of characters (e.g., of a pre-determined length) that represents the result of a hash algorithm applied to that group of transactions identified in the original subset of transactions 1206. The verification result 1210 might indicate that the signature 1204 matches the re-created original signature 1208 (in which case the state information has been positively verified as being accurate) or not (in which case the state information is not verified as being accurate).

Figure 13:
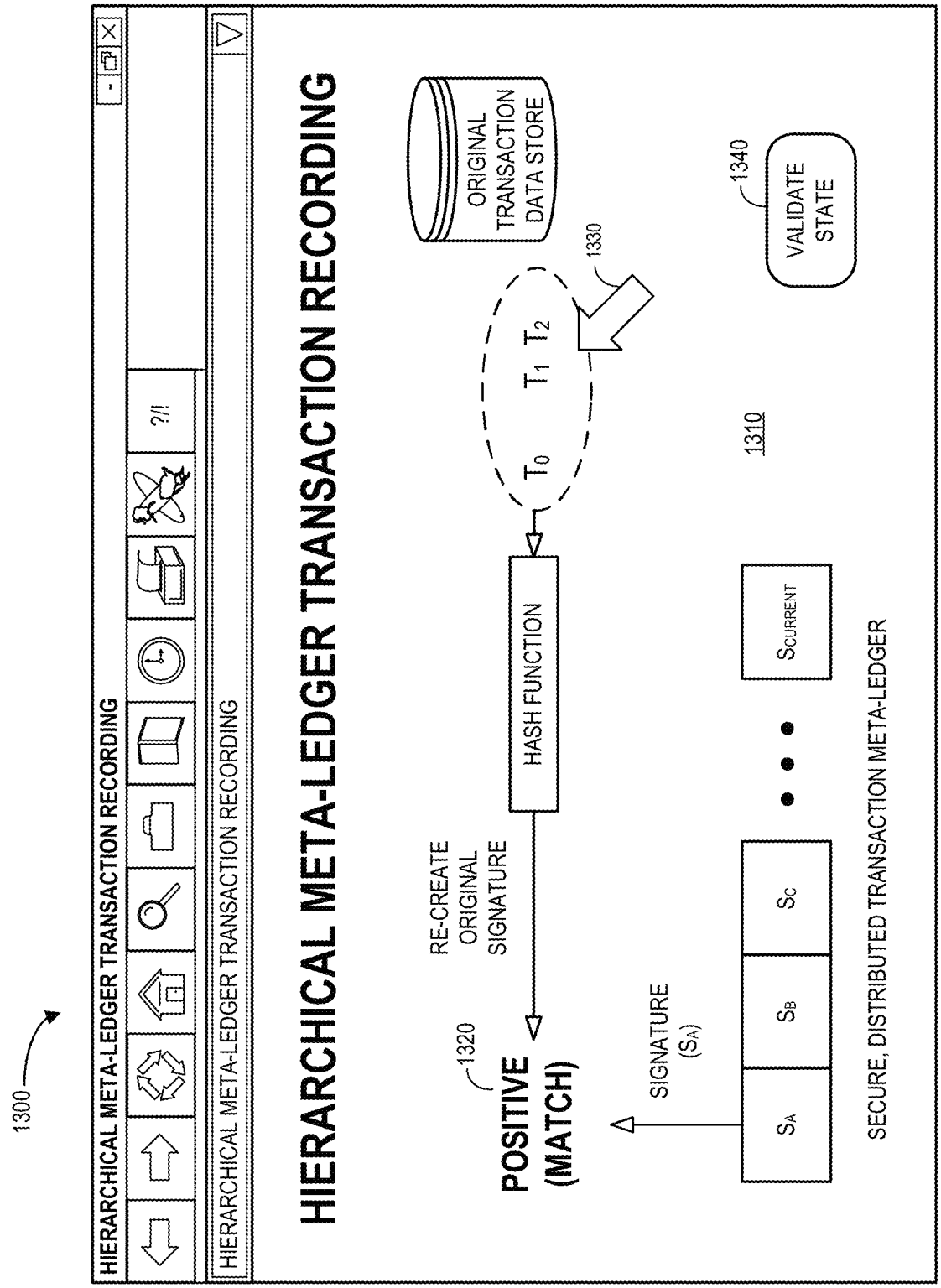
FIG. 13 illustrates a hierarchical meta-ledger transaction display in accordance with some embodiments.

FIG. 13 illustrates a hierarchical meta-ledger transaction display 1300 in accordance with some embodiments. The display 1300 includes a graphical representation 1310 of elements of a verification system (e.g., an original transaction data store, hash function, meta-ledger, etc.). According to some embodiments, selection of a graphical element on the display 1300 may result in a popup window displaying further details about that element (e.g., the value of a signature) and/or allow an operator to adjust parameters associated with that element (e.g., to select particular transactions in an original transaction data store). The display 1300 may further include a verification result 1320 (indicating whether or not state information about an enterprise has been verified). According to some embodiments, selection of a graphical icon 1340 via a computer mouse 1330 or touchscreen might, for example, perform a blockchain verification of state information, generate a report, transmit a status message to a third-party, etc.

Figure 14:
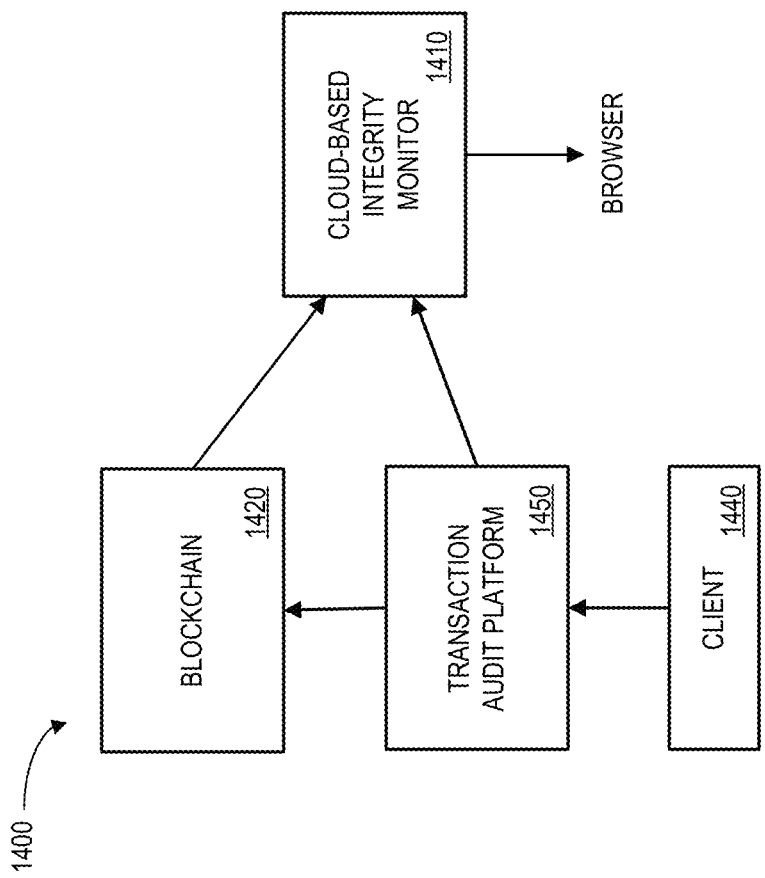
FIG. 14 is a system implementing a transaction audit platform incorporating blockchain validation according to some embodiments.
Figure 15:
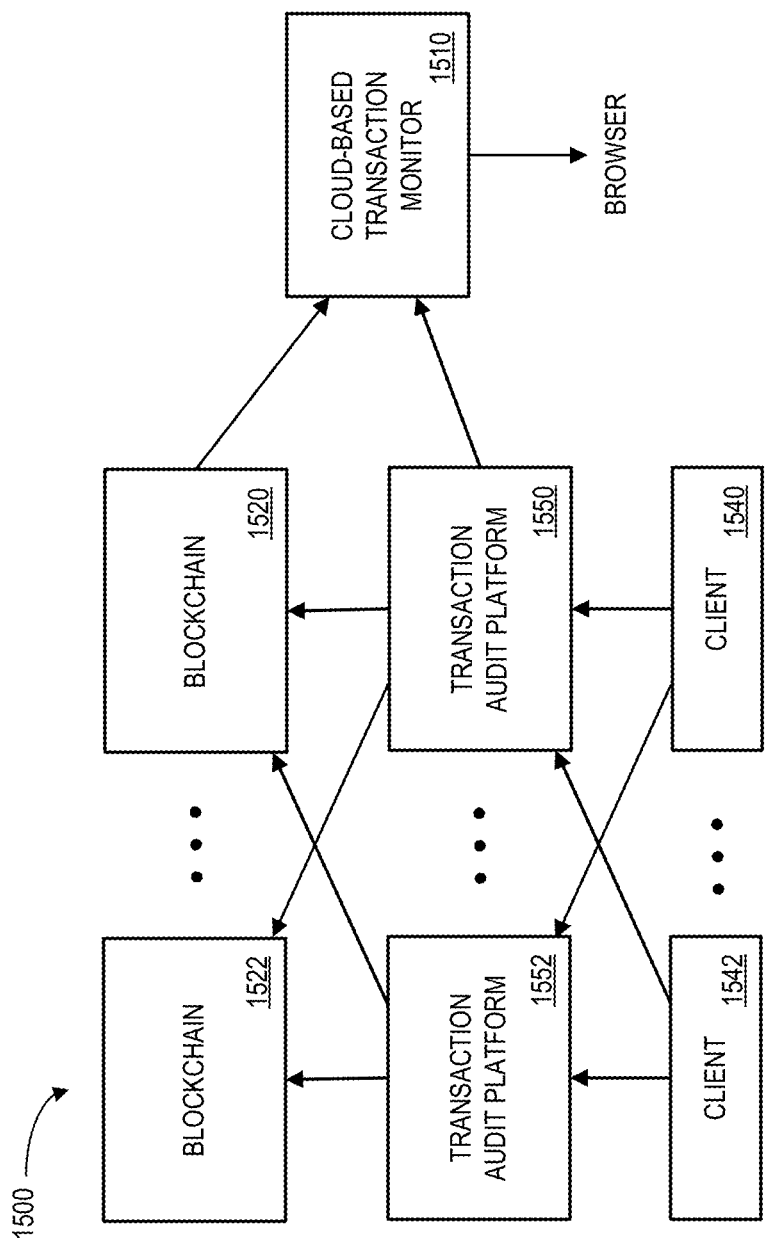
FIG. 15 is a system incorporating multiple transaction audit platforms in accordance with some embodiments.

An enterprise may record information about transactions using a secure, distributed transaction meta-ledger (e.g., via a blockchain verification process). For example, information about a subset of transactions, a date and time, a signature value, smart contract information, etc. via the secure, distributed transaction meta-ledger in accordance with any of the embodiments described herein. According to some embodiments, the distributed meta-ledger might be associated with the HYPERLEDGER® blockchain verification system. FIG. 14 is a system 1400 implementing a meta-ledger incorporating blockchain validation according to some embodiments. A cloud-based integrity monitor 1410 may provide transaction integrity data via a web browser and exchange information with a blockchain 1420 (or other secure distributed transaction ledger) and a transaction audit platform 1450 via Representational State Transfer ("REST") web services or other similar web services. The REST web services may, for example, provide interoperability between computer systems on the Internet (e.g., by allowing requesting systems to access and manipulate textual representations of web resources using a uniform, predefined set of stateless operations). According to some embodiments, portions of the transaction audit platform 1450 may be associated with database, such as a MySQL database. In this way, the transaction audit platform 1450 and blockchain 1420 can be used to provide transaction level verification for a client 1440 (including, for example, information about the state of enterprise). Although FIG. 14 illustrates a system 1400 with a single blockchain 1420 and transaction audit platform 1450, note that embodiments may employ other topologies. For example, FIG. 15 is a system 1500 implementing enterprise state verification incorporating multiple audit platforms in accordance with some embodiments. In particular, an additional blockchain 1522 and transaction audit platform 1552 may provide protection for an additional client 1542. As illustrated in FIG. 15, each transaction audit platform 1550, 1552 may be associated with multiple blockchains 1520, 1522 to provide additional protection for the system 1500 (e.g., by storing information at multiple, geographically disperse nodes and making attacks impractical). That is, each verifier (e.g., transaction audit platform 1550, 1552) may commit a brief summary to an independent data store (including for example, information about a group of transactions and an associated signature) and, once recorded, the information cannot be changed without detection to provide a tamper-proof System of Records ("SoR").

Figure 16:
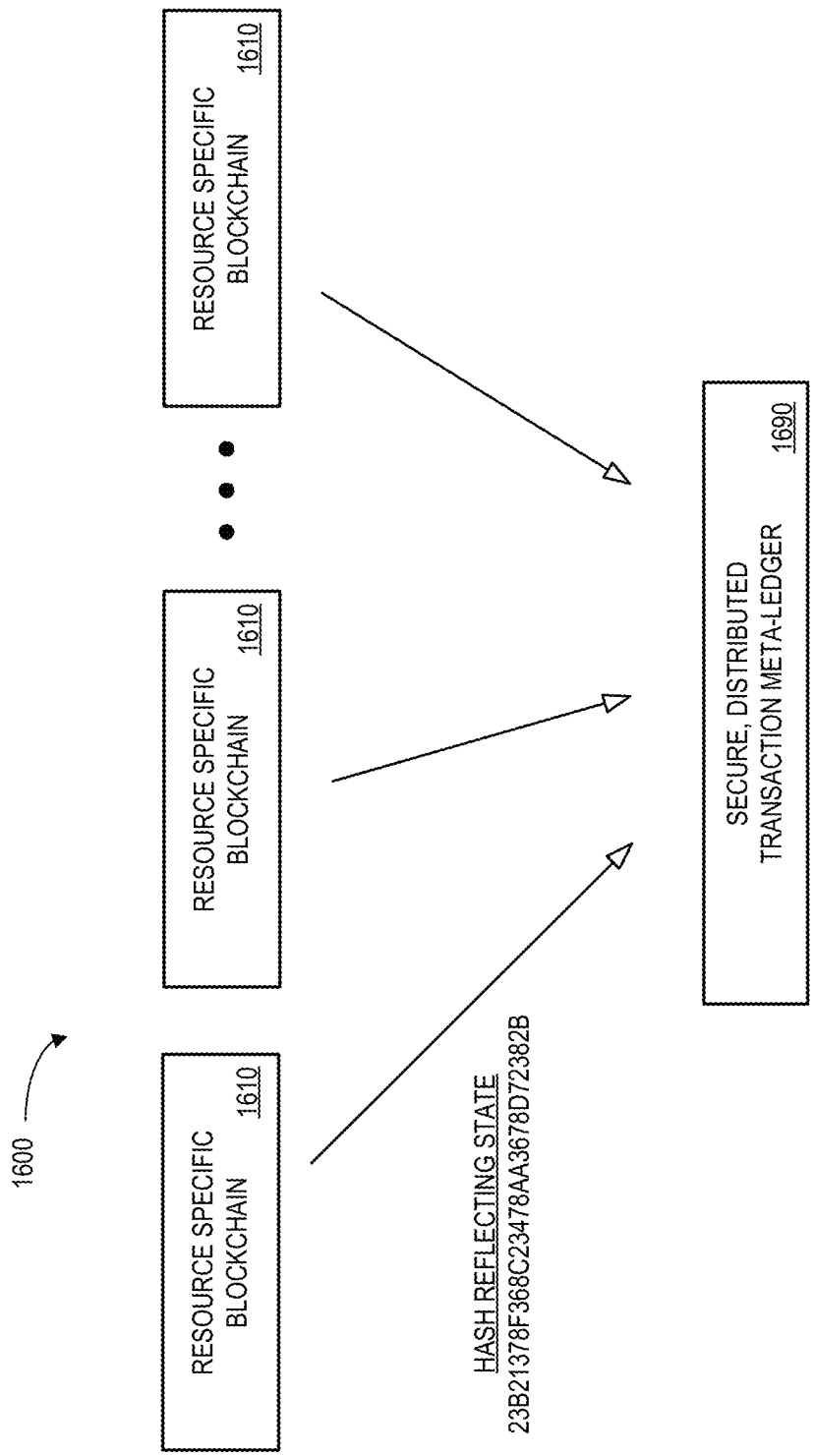
FIG. 16 illustrates a hierarchical meta-ledger system according to some embodiments.

In addition to using a secure, distributed system to implement the meta-ledger, some embodiments may also use one or more secure, distributed system to implement an original transaction data store. For example, FIG. 16 illustrates a hierarchical meta-ledger system 1600 according to some embodiments. In this example, one or more original transaction data stores are implemented using resource specific blockchains 1610. The system 1600 may then access those blockchains 1610 to create a hash reflecting the state of an enterprise. The hash may then be recorded in a secure, distributed meta-ledger 1690 in accordance with any of the embodiments described herein to preserve state information (thus creating a "hierarchy" of secure, distributed ledgers). The resource specific blockchains 16110 may, for example, refresh periodically (e.g., each day at the close of business) to record the processes and/or posture of the enterprise. Note that the resource specific blockchains 1610 and/or secure, distributed transaction meta-ledger 1690 might be implemented on a regionally or logically distributed basis.

Figure 17:
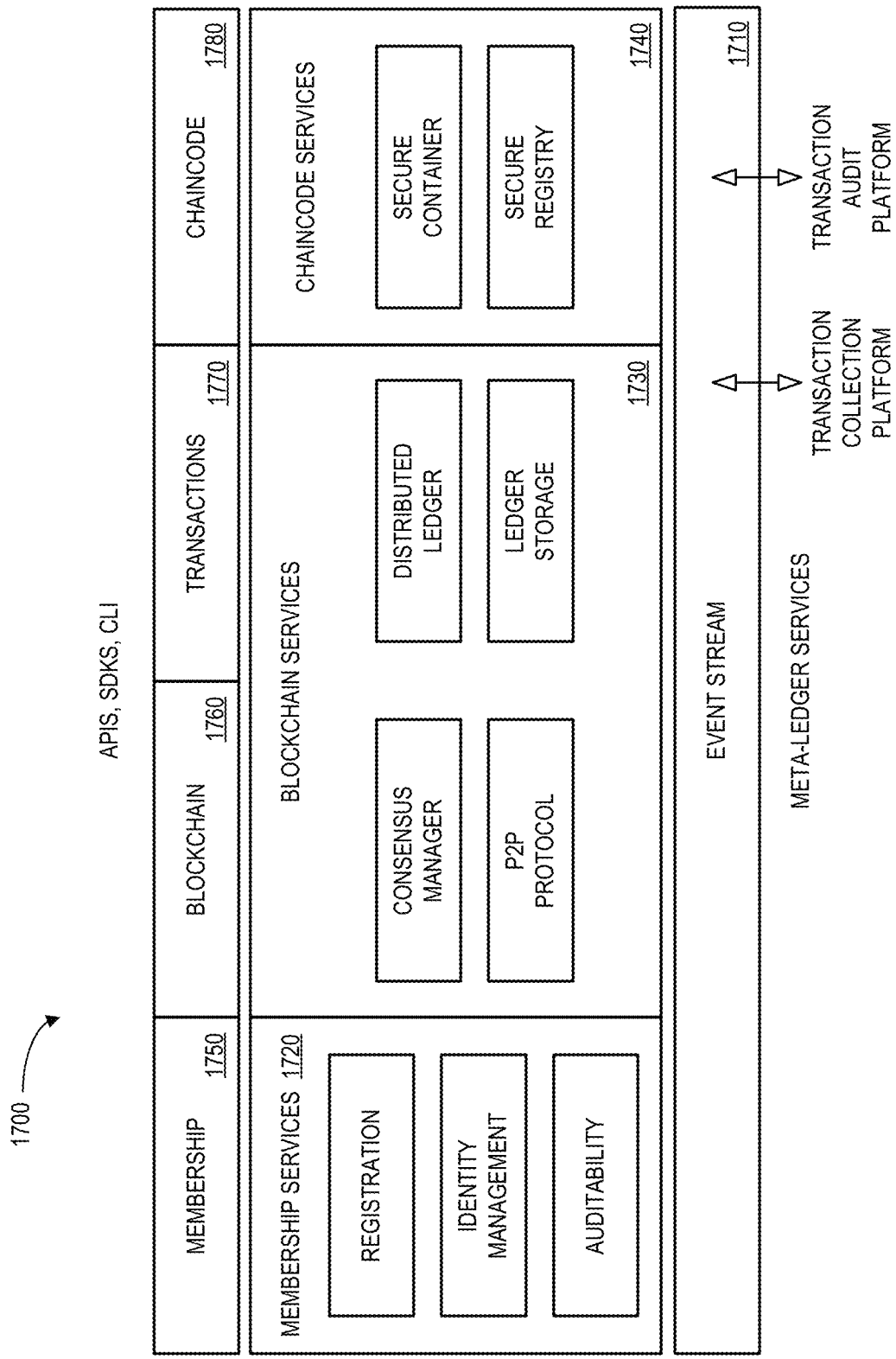
FIG. 17 is a distributed meta-ledger reference architecture according to some embodiments.

Embodiments may be associated with any type of distributed ledger having a de-centralized consensus-based network that supports smart contracts, digital assets, record repositories, and/or cryptographic security. For example, FIG. 17 is a distributed ledger reference architecture 1700 that might be associated with a resource specific ledger and/or a meta-ledger according to some embodiments. The architecture 1700 includes ledger services and an event stream 1710 that may contain transaction information reflecting the state of an enterprise (e.g., signatures from transaction data collection platform). Membership services 1720 (e.g., including registration, identity managements, and/or an auditability process) may manage identity, privacy, and confidentiality for membership 1750 for the network security service. Blockchain services (e.g., including a consensus manager, Peer-to-Peer ("P2P") protocol, a distributed ledger, and/or ledger storage) may manage the distributed ledger, for example, through a P2P protocol to maintain a single state that replicated at many nodes to support blockchains 1760 and transactions 1770. Chaincode services 1740 (e.g., secure container and/or a secure registry associated with a smart contract) may help compartmentalize smart contract (or chaincode 1780) execution on validating nodes. Note that the environment may be a "locked down" and secured container with a set of signed base images that contain a secure OS and programming languages. Finally, APIs, Software Development Kits ("SDKs"), and/or a Command Line Interface ("CLI") may be utilized to support a network security service via the reference architecture 1700.

Figure 18:
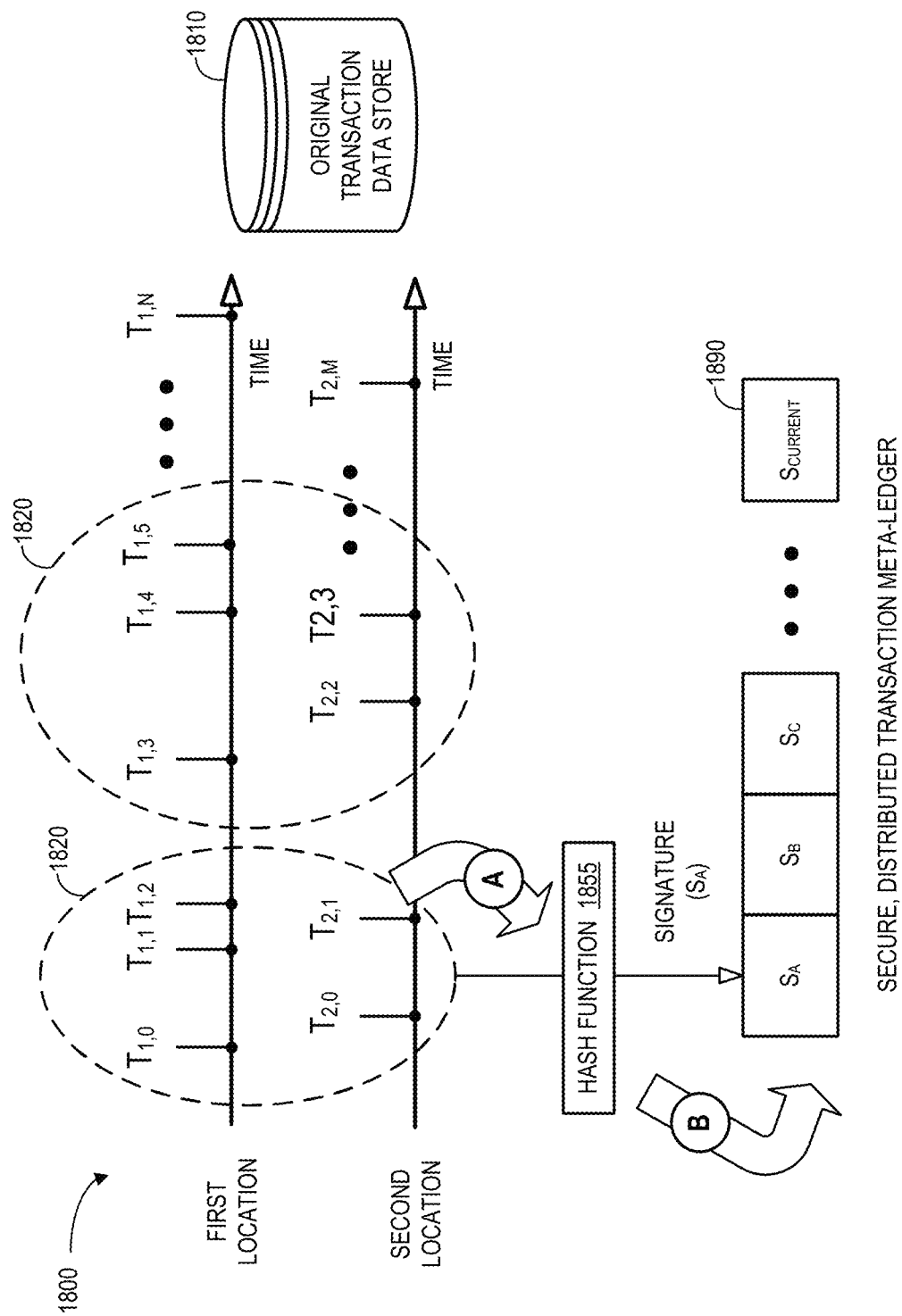
FIG. 18 is a high-level block diagram of a system associated with multiple locations according to some embodiments.

According to some embodiments, the group or subset of transactions recorded in a meta-ledger includes transactions that represent a plurality of geographic locations. For example, FIG. 18 is a high-level block diagram of a system 1800 associated with multiple locations according to some embodiments. In this case, a series of transactions $T_{1,0}$ through $T_{1,N}$ associated with a first location (e.g., a first geographic location, a first factory, a first three-dimensional printer, etc.) have occurred over time and are stored into an original transaction data store 1810. In addition, transactions $T_{2,0}$ through $T_{2,M}$ associated with a second location have occurred over time and are also stored into the original transaction data store 1810. As before the transactions have been grouped into subsets 1820 (e.g., as illustrated by a dashed line in FIG. 18, transactions $T_{1,0}, T_{1,1}, T_{1,2}, T_{2,0}$, and $T_{2,1}$ have been grouped into a subset). At (A), a hash function 1855 is applied to the first subset 1820 to create a hash value signature $S_A$ (e.g., a string of hexadecimal values of a pre-determined length). The signature $S_A$ is then stored into a secure, distributed meta-ledger 1890 at (B). As time goes on, additional signatures are stored into the meta-ledger 1890 (e.g., $S_B$, $S_C$, through $S_{CURRENT}$). The signatures in the meta-ledger 1890 may then later be used (e.g., by a transaction audit platform associated with a third party) to validate the state of the enterprise at various points in time. For example, the original transactions may be retrieved from the original transaction data store 1810. A hash function (e.g., the same function 1855 that was applied during data collection) may applied to those transactions to re-create the original signature. The signature $S_A$ stored in the meta ledger 1890 may then be retrieved and the two signature values can be compared to validate the state of the enterprise at both locations.

Thus, embodiments may allow for the reporting of the existence of data without revealing the actual data. Moreover, embodiments may provide flexibility in the type and granularity of data reported while anchoring the existence of data at a specific time. Embodiments may provide method to verify data is authentic (e.g., to supports a traditional insurance claim process or other state verification situation) without requirement that data is revealed during collection.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 19:
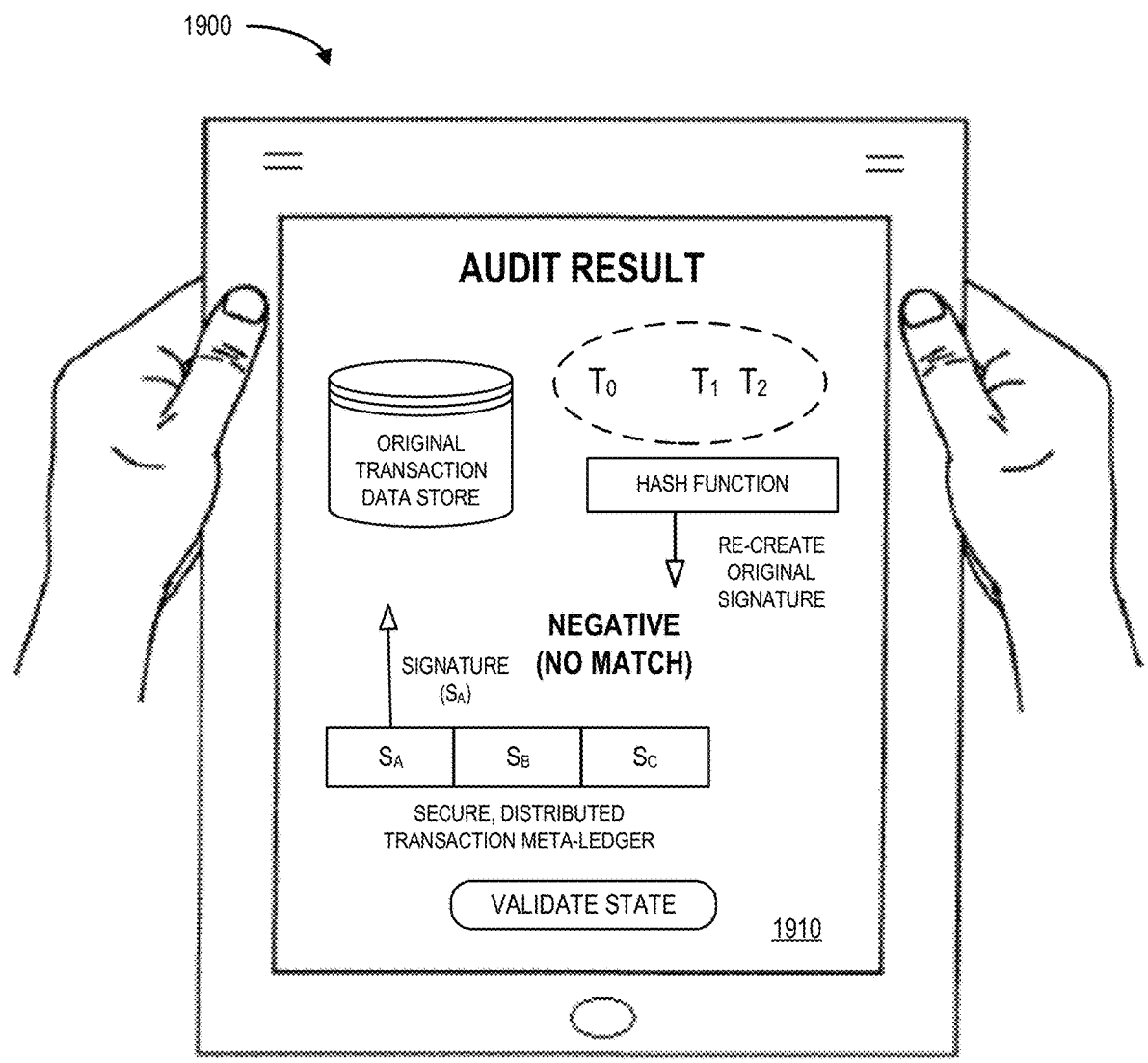
FIG. 19 is an example of a tablet computer rendering a transaction verification display according to some embodiments.

Although specific hardware and data configurations have been described herein, note that any number of other configurations may be provided in accordance with embodiments of the present invention (e.g., some of the information described herein may be combined or stored in external systems). Moreover, although embodiments have been described with respect to particular types of enterprises and transactions, note that embodiments might be associated with other situations where the state of enterprise may need to be validated. Similarly, the displays shown and described herein are provided only as examples, and other types of displays and display devices may support any of the embodiments. For example, FIG. 19 is an example of a tablet computer 1900 rendering a transaction verification result display 1910 according to some embodiments. The display 1310 includes a graphical representations verification system elements (e.g., an original transaction data store, hash function, meta-ledger, etc.). According to some embodiments, selection of a graphical element on the display 1310 may result in a popup window displaying further details about that element (e.g., the value of a signature) and/or allow an operator to adjust parameters associated with that element (e.g., to select particular transactions in an original transaction data store). The display 1300 may further include a verification result 1320 (indicating whether or not state information about an enterprise has been verified). According to some embodiments, selection of a "Validate State" icon via a touchscreen might, for example, perform a blockchain verification of state information, generate a report, automatically transmit a status message to a third-party, etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to record and audit verifiable state information associated with an enterprise, comprising:
   an original secure, distributed transaction ledger to provide information about a series of transactions over time associated with the enterprise;
   a transaction data collection platform, including:
      a communication port to receive the information about the series of transactions over time, and a transaction data collection computer processor, coupled to the communication port, adapted to:
　group a plurality of the series of transactions into a subset of transactions,
　apply a hash function to the subset of transactions to create a signature representing verifiable state information associated with the enterprise, and
　record information about the signature via a secure, distributed transaction meta-ledger without recording the subset of transactions; and
a transaction audit platform, coupled to the secure, distributed transaction meta-ledger and the original transaction data store, adapted to:
　retrieve the signature from the secure, distributed transaction meta-ledger,
　retrieve, from the original transaction data store, original information associated with the subset of transaction,
　apply the hash function to the original information to re-create an original signature,
　compare the retrieved signature with the original signature, and
　output an indication of a verification result of said comparison.

2. The system of claim 1, wherein the grouping performed by the transaction data collection platform is performed at least one of: (i) after a pre-determined period of time, (ii) after a pre-determined number of transaction, (iii) when the series of transactions contain a pre-determined amount of data.

3. The system of claim 1, wherein the subset of transactions includes transactions representing a plurality of geographic locations.

4. The system of claim 1, wherein the series of transactions is associated with an industrial asset item and include at least one of: (i) an item identifier, (ii) an item description, (iii) a manufacturing process parameter, (iv) a quality control value, (v) transportation information, and (vi) date information.

5. The system of claim 1, wherein the series of transactions is associated with cyber-security and include at least one of: (i) a software identifier, (ii) software update information, (iii) a network access log, and (iv) anti-virus software data.

6. The system of claim 1, wherein the series of transactions is associated with a digital twin of a physical system and include at least one of: (i) a system identifier, (ii) a digital twin identifier, (iii) a sub-component identifier, (iv) an activity log, (v) sensor values, (vi) monitoring node information, and (vii) output data.

7. The system of claim 1, wherein the hash function is associated with at least one of: (i) a Secure Hash Algorithm 1 ("SHA-1"), (ii) a Message Digest 5 ("MD5") hash function, (iii) a digital fingerprint, (iv) a digital signature, and (v) a key value.

8. The system of claim 1, wherein the original secure, distributed transaction ledger and the secure, distributed transaction meta-ledger comprise blockchain technology.

9. The system of claim 1, wherein information about multiple subsets of transactions are recorded in the secure, distributed transaction meta-ledger.

10. The system of claim 1, wherein information about subsets of transactions from multiple original secure, distributed transaction ledgers are recorded in the secure, distributed transaction meta-ledger.

11. A computer-implemented method to record and audit verifiable state information associated with an enterprise, comprising:
　storing, in an original secure, distributed transaction ledger, electronic records that represent original information of a series of transactions over time associated with the enterprise;
　receiving, at a transaction data collection platform from an original transaction data store, information about the series of transactions over time; grouping a plurality of the series of transactions into a subset of transactions;
　applying a hash function to the subset of transactions to create a signature representing verifiable state information associated with the enterprise;
　recording information about the signature via a secure, distributed transaction meta-ledger without recording the subset of transactions;
　retrieving, at a transaction audit platform, the signature from the secure, distributed transaction meta-ledger;
　retrieving, from the original transaction data store, original information associated with the subset of transactions;
　applying the hash function to the original information to re-create an original signature;
　comparing the retrieved signature with the original signature; and
　outputting an indication of a verification result of said comparison.

12. The method of claim 11, wherein the hash algorithm is associated with at least one of: (i) a Secure Hash Algorithm 1 ("SHA-1"), (ii) a Message Digest 5 ("MD5") hash function, (iii) a digital fingerprint, (iv) a digital signature, and (v) a key value.

* * * * *